United States Patent

[11] 3,628,018

| [72] | Inventor | Francois Desvignes<br>Bourg La Reine, France |
|---|---|---|
| [21] | Appl. No. | 879,723 |
| [22] | Filed | Nov. 25, 1969 |
| [45] | Patented | Dec. 14, 1971 |
| [73] | Assignee | U. S. Philips Corporation<br>New York, N.Y. |
| [32] | Priority | Nov. 27, 1968 |
| [33] | | France |
| [31] | | 175.530 |

[54] DEVICE FOR CONTROLLING THE ATTITUDE OF A SPACECRAFT BY MEANS OF AN ELECTRO-OPTIC MODULATOR
11 Claims, 3 Drawing Figs.

[52] U.S. Cl. ................................................ 250/83.3 H,
244/1 SS, 250/229
[51] Int. Cl. .................................................. G01d 5/34
[50] Field of Search .......................................... 250/83.3
IR, 229, 203; 244/1

[56] References Cited
UNITED STATES PATENTS

| 3,175,092 | 3/1965 | Leftwich | 250/83.3 IR X |
| 3,205,362 | 9/1965 | Dryden | 250/83.3 IR X |
| 3,351,756 | 11/1967 | Kallet et al. | 250/83.3 IR |

*Primary Examiner*—James W. Lawrence
*Assistant Examiner*—Morton J. Frome
*Attorney*—Frank R. Trifari ABSTRACT: An attitude scanning device for a spacecraft which is in a circular orbit about the earth, which device can be used during the coarse and the final determinations of this attitude. A bolometer receives the infrared radiation from the earth after this radiation has been modulated by an electro-optical modulator composed of sectors. The device enables the rolling and pitching errors to be simultaneously determined.

INVENTOR.
FRANCOIS DESVIGNES

DEVICE FOR CONTROLLING THE ATTITUDE OF A SPACECRAFT BY MEANS OF AN ELECTRO-OPTIC MODULATOR

The present invention relates to a device for controlling the attitude of a spacecraft, which device comprises an optical system, an electro-optical modulator and an infra-red radiation detector.

The spacecraft whose attitude is to be controlled is in an orbit about a heavenly body or a planet and is required to retain a given attitude relative to this body or planet.

The orbits described by the satellite (the spacecraft) may have two forms: elliptical or circular. Hence, the degree of complexity of the launching depends upon the choice made and in the case of communication satellites which enable substantially continuous transmission of electromagnetic signals between two given widely remote regions, synchronous satellites will be used. For relaying the signals with the required degree of accuracy the satellite, as is well known, must be put into circular orbits.

The launching of a satellite into a circular orbit comprises several stages:

1. the satellite is launched into a low elliptical orbit, a so-called parking orbit;
2. at a given instant an impulse is then imparted to the satellite which converts this orbit into an elongate orbit, the apogee of which must be spaced from the earth by the distance corresponding to the ultimate orbit: this is the transition stage;
3. finally, when the satellite is in the apogee of the transition orbit a new impulse is imparted to it which causes the orbit to become less eccentric or even circular.

During the two latter stages, it is very important that the spacecraft be controllable with the highest possible accuracy in order to bring it to an accurately determined position. When the spacecraft is in its ultimate orbit, a final driving stage enables its attitude to be determined. Once the attitude has been determined it must be maintained with the higher accuracy as it has been intended for optical or astronomical observations or for the transmission of radio waves. The variable quantities, i.e. the position and the speed of the spacecraft, are continuously being measured by detectors which transmit these data in the form of electric signals either to computing and steering devices in the satellite, or to terrestrial stations capable of controlling the steering devices of the satellite. Consequently, the satellite must have a given attitude and must be capable of making the corrections necessary for carrying out its mission.

If a passive device is inserted into an orbit, it obeys the laws of classic mechanics and maintains a certain movement about its center of gravity. Hence there must be a possibility of controlling or stopping this movement. If a spatial coordinate system for the satellite and a spatial coordinate system relative to fixed astronomical reference points, a so-called absolute coordinate system, are determined, the satellite will show the following movements: a transverse oscillating movement (rolling), a longitudinal oscillatory movement (pitching) and a lateral oscillatory movement (yawing).

If the spacecraft is to act as a satellite, for example, an earth satellite, two of these movements, rolling and pitching, are advantageously determined by utilizing the infrared radiation from the surface of the earth. The yawing movement can only be corrected in relation to a fixed reference point, such as the sun or the stars, by means of a device which is sensitive to the radiation of the sun or of the stars or to radio-electric radiation.

The apparatus used for detecting the radiation and the associated electronic circuits are subject to errors, which may be due to possible deviations both of the detector and of the electronic circuits. These problems can readily be avoided in a satellite the attitude of which is stabilized by means of rotation by monitoring the level of the rectangular signal generated by the periodic passage of the earth in the field of the radiation-sensitive device. When the attitude of the satellite is known, the time interval between the leading and trailing edges of the rectangular signal provides an indication of the axis of the cone which is described by the sighting direction of the radiation-sensitive device during the rotation.

In the case of satellite whose attitude is stabilized about three axes (rolling, pitching, yawing) by gyroscopes or gas jets, this rotation movement is no longer available. The importance of a solution using such a movement is such that wherever possible sensitive devices are used which reproduce this movement.

In a known device an optical system which is driven at a constant rotation speed by an electric motor analyses the radiation which comes from space in a direction which is fixed with respect to the satellite. The choice of this fixed direction, of the sighting angle and of the rotation speed are parameters which occur in the properties (field of acquisition, sighting accuracy) of the device and the values of which depend upon the characteristics of the mission of the satellite.

However, this solution, which utilizes a continuously moving mechanism, cannot be regarded being sufficiently reliable for a long term mission and hence the use of deviation or modulation devices containing no moving members, in particular electro-optical modulation devices, is preferred. Such modulation devices utilize a phenomenon which is based on the property exhibited by the free electrons in a solid, namely the absorption of light. Actually, the concentration of free charge carriers in a semiconductor material can be influenced, at least locally, by the provision of a PN-junction and by applying a potential difference to this junction. In this manner the light incident on the material can simply be modulated.

Horizon-scanning devices are equipped with such modulators, however, they require the use of several optical systems containing such modulators to enable these scanning devices to cover the scanning field necessary for obtaining and maintaining the attitude of the satellite.

The invention relates to a horizon-scanning device of the aforementioned type which, however, has important advantages over the existing systems, specifically with respect to:

the size of the field of acquisition (which may be up to 30°) during the period of coarse adjustment of the attitude, the use of the same arrangement for the linear domain when the satellite must correct its small deviations from a fixed attitude, the reliability, which is partly due to the technical design of the modulator.

For this purpose, the device according to the invention is characterized in that the optical system contains an annular opening which accommodates an electro-optical modulator comprising at least three sectors. This opening is defined by the outer diameter of a circular screen and the inner diameter of a circular diaphragm, which screen and diaphragm are arranged concentrically in the image focal plane of the assembly of an objective and a collector lens which are made of a material which transmits a selected radiation band. The inner and outer diameters of the opening and the positions and focal lengths of the objective and of the collector lens are chosen so that the beam which can pass through the opening is defined in the object space by two cones of given solid angles.

The invention will now be described more fully with reference to the accompanying drawing, which shows an embodiment, given by way of example, in which.

Figure 1:
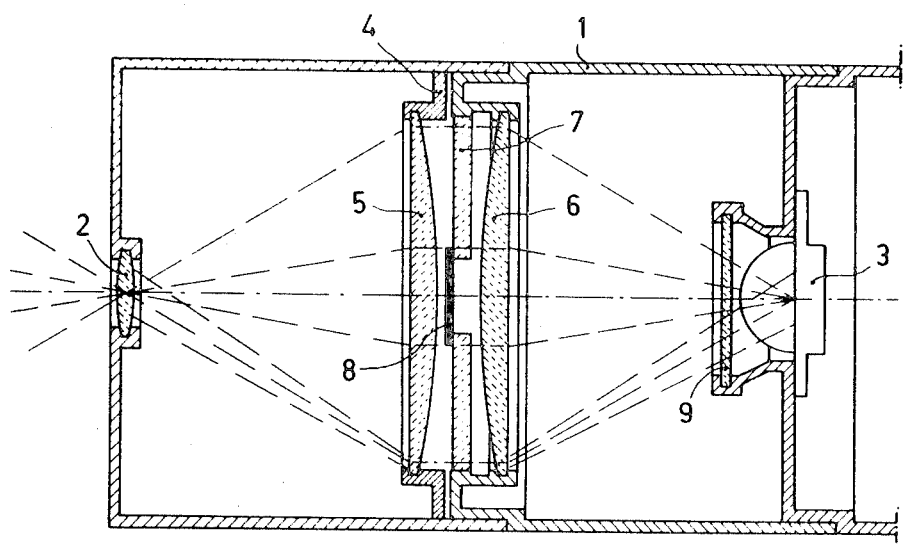
FIG. 1 is a sectional view of a device according to the invention.

The optical system shown in FIG. 1 is accommodated in a housing 1, which on one face carries an objective 2 and on the opposite face a detector 3. In this embodiment the detector is a bolometer in the form of a thermistor embedded in a hemispherical germanium lens. Between the said two faces a support 4, which also serves as a diaphragm, carries an optical system comprising two planoconvex lenses 5 and 6 and a modulator 7 carrying a screen 8 at its center.

The annular support 4 acts as a diaphragm and is arranged in the image focal plane of the assembly comprising the objective 2 and the collector lens 5 which are made of germanium. A screen 8 is arranged concentrically with this diaphragm and defines an annular opening. The inner diameter of this opening, which corresponds to the diameter of the screen 8, and its outer diameter, which corresponds to the inner diameter of the diaphragm 4, and the positions and focal lengths of the lenses 5 and 2 are such that the beam which can pass through the opening is defined in the object space by two cones the semisolid angle of which is determined in accordance with the planet which is sighted. In actual fact, the diameter of the screen 8 must at most be equal to the diameter of the image received from the planet sighted and for a predetermined attitude.

With a view to the quality of the image, the collector system (hereinbefore a single lens 5 has been referred to) is preferably divided into two elements each arranged on either side of the modulator 7. The second collector lens 6 together with the first one forms an image of the objective 2 in the plane containing the sensitive surface of the bolometer 3.

On the other hand, the diameter of the objective lens 2 is chosen so that in spite of aberrations of the lenses 5 and 6, the mount 4 of the lens 5 does not act as a diaphragm for the sensitive surface of the bolometer. Finally, a filter 9 is arranged immediately in front of the bolometer.

Figure 2:
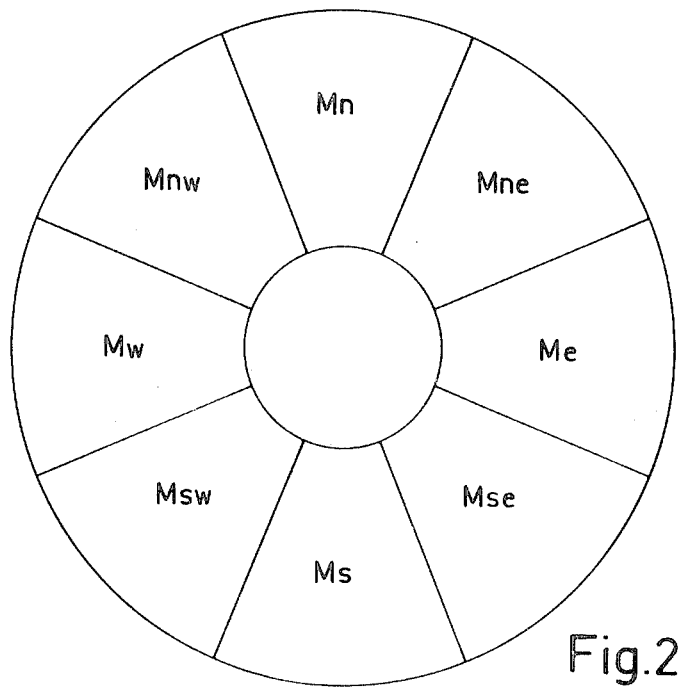
FIG. 2 is a front elevation of the electro-optical modulator.

The annular electro-optical modulator 7 comprises eight equal sectors (FIG. 2). Hereinafter the four sectors Mn, Ms, Mw and Me will be referred to as normal sectors, and the four remaining sectors Mne, Mnw, Mse and Msw will be referred to as auxiliary sectors.

If the satellite is correctly trained, the image of the earth exactly covers the central portion formed by the screen 8. The eight optical paths receive no radiation from the planet at all. A slight deviation in the form of rolling causes the image of the earth to overlap part of the sector Mn or of the sector Ms. A deviation in the form of pitching results in partial overlapping of the sector Mw or Me.

The four auxiliary sectors Mnw, Mne, Msw and Mse are used in the following cases:

During the coarse adjustment the earth, when it is at nearly 30° from the axis of the device, may fall in none of the four normal sectors Mn, Ms, Mw and Me;

when the sun is in the field of one of the four sectors Mn, Ms, Mw and Me: a sun scanner Sc (FIG. 3) then prescribes the transition from the normal series to the auxiliary series;

in the case of complete or partial failure of the four normal sectors.

If the power consumption and the complexity of the electronic circuit is to be economized and if it is acceptable that the scanning device cannot be trained when the sun is in its field, a modulator comprising four quadrants will be sufficient.

Figure 3:
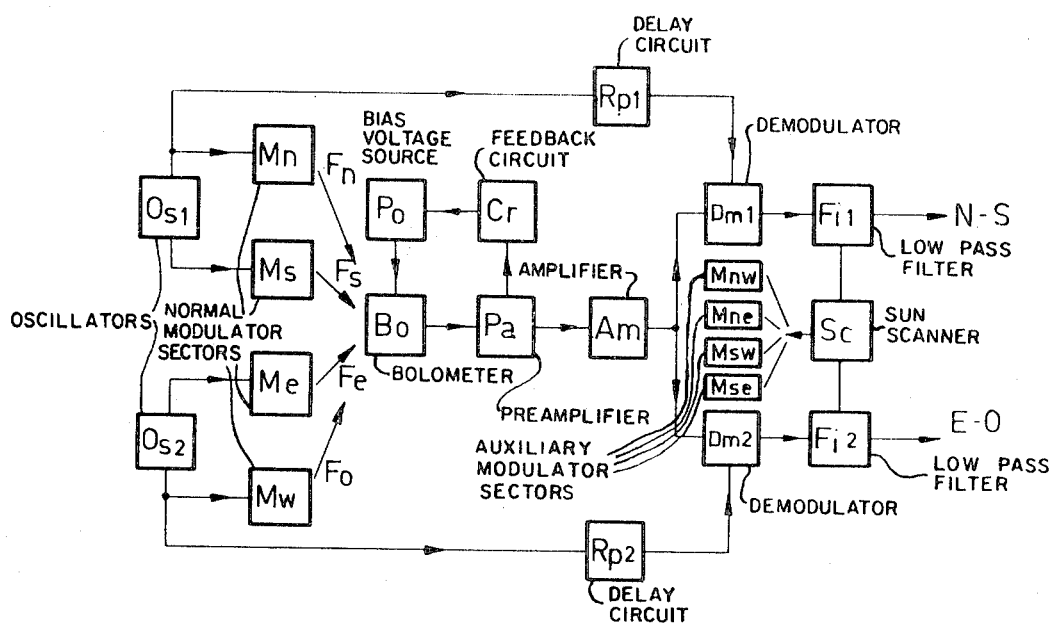
FIG. 3 shows in block-schematic form the associated electronic circuit.

The associated electronic circuit arrangement is shown schematically in FIG. 3.

Since the bolometer Bo serves for two pairs of paths, i.e. North-South and East-West, in order to enable a distinction to be made between the signals either the pair of North-South modulators and the pair of East-West modulators will be alternately fed or both pairs will be fed simultaneously at different frequencies, the signals being subsequently separated by synchronous demodulation.

To illustrate the operation of the various electronic circuits, only a single pair of paths will be considered in detail, for example, the path corresponding to the modulator sectors Mn and Ms and to the bolometer Bo. The sectors are fed in phase opposition by an oscillator $Os_1$. The bolometer is fed through a biassing circuit Po and the signal is applied to a preamplifier Pa. A negative feedback circuit Cr stabilizes the operating point of the bolometer in view of an increase of the temperature range in which it can operate. The alternating voltage output signal of the preamplifier Pa is amplified by an amplifier Am to a level such that it can be converted into a direct voltage signal by a synchronous demodulator $Dm_1$ which is controlled by a reference signal taken from the oscillator $Os_1$. If required, this reference signal is delayed by the circuit $Rp_1$ in order to allow for the reactive elements of the amplifying circuits and especially of the photoelectric signal generator of the bolometer. The output current of $Dm_1$ flows through a low-pass filter $Fi_1$ the characteristic of which determines the bandwidth of the system.

As will be seen, if both fluxes Fn and Fs which flow through the modulator sectors Mn and Ms, respectively, to reach the bolometer are equal, the ground frequency of the signal delivered by the bolometer will be zero, as will be the direct current component from $Dm_1$. The strength and the sign of the component which is produced in the case of inequality of Fn and Fs depend upon the difference between the said two fluxes and upon its sign.

After the output current of the demodulator has passed through the filters, it is supplied to the control members of the devices which have the task of restoring the correct attitude of the satellite.

I claim:

1. A device for controlling the attitude of a spacecraft comprising an infrared radiation detector, an optical system adapted to receive radiation from a target and for directing said radiation onto said radiation detector, said optical system comprising an assembly including an objective and a collector lens which are made of a material that transmits the selected radiation band, a circular screen and a circular diaphragm concentrically arranged in the image focal plane of the assembly of the objective and collector lens, said diaphragm and screen together defining an annular opening which accommodates an electro-optical modulator comprising at least three sectors, which opening is defined by the outer diameter of the circular screen and the inner diameter of the circular diaphragm, the inner and outer diameters of the opening and the positions and focal lengths of the objective and of the collector lens being arranged and chosen so that the radiation beam which can pass through the opening is defined in the object space by two cones having given solid angles.

2. A device as claimed in claim 1, characterized in that the diameter of the screen is at most equal to the diameter of the image of the celestial body received by the screen and serving as the sighting target for the attitude control.

3. A device as claimed in claim 1 wherein said modulator comprises a stationary disc divided into sectors and composed of a semiconductor material that will pass light energy as a function of the voltage applied thereto, and means for applying a periodic voltage to given sectors of the disc.

4. A sensing device for indicating the deviation of a space vehicle from a predetermined attitude relative to a remote target body comprising, a radiation detector responsive to radiation in a selected band, an electro-optical modulator comprising a disc divided into at least three spaced sectors, and an optical system adapted to receive and direct the radiation from said body onto said detector, said optical system comprising, an assembly that includes an objective and a collector lens composed of a material that transmits the selected radiation band, an annular diaphragm and a circular screen concentrically arranged in the image focal plane of said assembly, said diaphragm and screen defining an annular opening limited by the outer diameter of the circular screen and the inner diameter of the diaphragm, and means for supporting said modulator disc in said annular opening, the elements of said optical system being arranged and chosen so that the radiation beam which can pass through the annular opening is defined by two solid cones.

5. A device as claimed in claim 4 wherein the modulator disc is composed of a material that exhibits a variable absorption of radiation energy as a function of a voltage applied thereto, and means for applying a periodic voltage to given sectors of the disc thereby to vary the radiation energy passed by said disc.

6. A device as claimed in claim 5 wherein said disc is a solid annular member with at least four wedge-shaped sectors equally spaced about the disc circumference.

7. A device as claimed in claim 6 wherein said voltage applying means comprises a first source of voltage coupled to one pair of diametrically opposed disc sectors in phase opposition and a second source of voltage coupled to a second pair of diametrically opposed disc sectors in phase opposition.

8. A device as claimed in claim 7 further comprising first and second synchronous demodulators each coupled to the output of the radiation detector and respectively synchronized with said first and second voltage sources.

9. A device as claimed in claim 4 wherein the modulator disc is composed of a semiconductor material arranged to form PN junctions and means for applying a periodic voltage to said junctions in given sectors of the disc thereby to modulate the amount of radiation energy passed by said disc.

10. A device as claimed in claim 5 wherein said disc is stationary and said screen is opaque to radiation in the selected band.

11. A device as claimed in claim 10 wherein the selected radiation band is in the infrared region, said detector comprises a bolometer and said collector lens has a planoconvex shape and is mounted to one side of the modulator disc, said device further comprising a second planoconvex lens mounted on the other side of the modulator disc, said lenses being composed of germanium.

* * * * *